United States Patent
Woody et al.

(10) Patent No.: US 8,240,234 B2
(45) Date of Patent: Aug. 14, 2012

(54) METHODS AND SYSTEMS FOR CHIP BREAKING IN TURNING APPLICATIONS USING CNC TOOLPATHS

(75) Inventors: Bethany A. Woody, Charlotte, NC (US);
Kevin Scott Smith, Huntersville, NC (US); David J. Adams, Keene, NH (US); William E. Barkman, Oak Ridge, TN (US); Edwin F. Babelay, Jr., Knoxville, TN (US)

(73) Assignees: University of North Carolina at Charlotte, Charlotte, NC (US); Babcock & Wilcox Technical Services Y-12, LLC, Oak Ridge, TN (US)

( * ) Notice: Subject to any disclaimer, the term of this patent is extended or adjusted under 35 U.S.C. 154(b) by 965 days.

(21) Appl. No.: 12/251,247

(22) Filed: Oct. 14, 2008

(65) Prior Publication Data
US 2009/0107308 A1    Apr. 30, 2009

Related U.S. Application Data

(60) Provisional application No. 60/980,276, filed on Oct. 16, 2007.

(51) Int. Cl.
*B23Q 15/14* (2006.01)
*B23B 15/26* (2006.01)

(52) U.S. Cl. .......................................... 82/1.11; 82/118

(58) Field of Classification Search ............... 82/1.11, 82/118, 134, 132, 901, 904; 408/17, 143
See application file for complete search history.

(56) References Cited

U.S. PATENT DOCUMENTS

| | | | | |
|---|---|---|---|---|
| 4,646,595 A * | 3/1987 | Slee | ............................... | 82/118 |
| 4,667,546 A * | 5/1987 | Dombrowski et al. | ......... | 82/104 |
| 4,693,146 A * | 9/1987 | Dombrowski et al. | ......... | 82/118 |
| 5,019,115 A * | 5/1991 | Schneider et al. | ............. | 82/1.11 |
| 5,291,812 A * | 3/1994 | Yen et al. | ......................... | 82/134 |
| 5,342,152 A * | 8/1994 | Medeksza | ..................... | 408/1 R |
| 7,587,965 B2 * | 9/2009 | Mann et al. | ..................... | 82/1.11 |
| 7,628,099 B2 * | 12/2009 | Mann et al. | ..................... | 82/1.11 |

OTHER PUBLICATIONS

P. F. Ostwald, J. E. Shamblin; "Effects of Dynamic Chip-Breaking Upon Surface Microgeometry and Free Chip Dimension"; Journal of Engineering for Industry, pp. 71-78, Feb. 1968, Issue 90, New York, NY.
V. T. Chilikov; "Kinematic Chipbreaking Devices for Machine Tools"; Stanki I Instrument, vol. 45, Issue 3, 1974, pp. 10-12; Poland.
D. F. Pearce, D. B. Richardson; "Machining Stability Using Controlled Contact Tools"; Int. J. Prod. Res., 1975, vol. 13, Issue 1, pp. 76-82; Taylor & Francis Ltd., London. Milan Dlouhy, Josef Houdek; "Forming of Chips by Tool Oscillation"; Stanki I Instrument, vol. 30, Issue 12, pp. 11-16; Moscow.
V. I. Matyushko; "Controlling Surface Finish in Turning Operations With Vibratory Chip-Breaking"; Vestnik Mashinostroeniya, vol. 67, Issue 3, 1987, pp. 47-48.

* cited by examiner

*Primary Examiner* — Will Fridie, Jr.
(74) *Attorney, Agent, or Firm* — Clements Bernard PLLC; Christopher L. Bernard; Lawrence A. Baratta, Jr.

(57) ABSTRACT

The present invention provides methods and systems for chip breaking, controlling cutting tool wear, and the like in turning, boring, and other applications, including: engaging a workpiece with a cutting tool in a feed direction along a toolpath, superimposing an oscillation in the feed direction on the toolpath, and dynamically or non-dynamically varying the oscillation superimposed in the feed direction on the toolpath such that interrupted cuts and chips of a predetermined length or less are produced. These systems take full advantage of computer numerical control (CNC) methodologies.

22 Claims, 16 Drawing Sheets

METHODS AND SYSTEMS FOR CHIP BREAKING IN TURNING APPLICATIONS USING CNC TOOLPATHS

CROSS-REFERENCE TO RELATED APPLICATION(S)

The present non-provisional patent application claims the benefit of priority of U.S. Provisional Patent Application No. 60/980,276, filed on Oct. 16, 2007, and entitled "CNC TOOLPATHS FOR CONTROLLING THE CHIP BREAKING PROCESS IN TURNING APPLICATIONS," the contents of which are incorporated in full by reference herein.

STATEMENT REGARDING FEDERALLY SPONSORED RESEARCH OR DEVELOPMENT

The U.S. Government has a paid up license in this invention and the right, in limited circumstances, to require the patent owner to license to others on reasonable terms as provided for by the terms of Contract No. DE-AC05-00OR22800 between the U.S. Department of Energy and Babcock & Wilcox Technical Services Y-12, L.L.C.

FIELD OF THE INVENTION

The present invention relates generally to methods and systems for chip breaking, controlling cutting tool wear, and the like in turning, boring, and other applications using computer numerical control (CNC) toolpath commands. More specifically, the present invention relates to methods and systems for chip breaking, controlling cutting tool wear, and the like in turning, boring, and other applications using CNC toolpath commands that provide effective chip control over a wide range of part geometries and materials. These methods and systems dramatically reduce the probability of creating a continuous, unbroken chip, thereby reducing the temperature of the cutting tool and enabling unattended machining.

BACKGROUND OF THE INVENTION

The implementation of CNC machine tools has greatly increased the productivity of metal cutting processes, and greatly increased the precision and complexity of parts that may be manufactured. The ability to manufacture parts under computer control has also significantly decreased the need for continuous operator supervision, and allowed one operator to manage a number of machines simultaneously. In some cases, machining operations are largely unattended. However, such efficiencies are strongly limited by chip control issues, especially in turning and boring applications. A common problem in the automation of these applications is the production of continuous, unbroken chips. These long, stringy chips tend to lead to tangles around the tool and workpiece, potentially damaging both the part and machine. This problem is largely unpredictable, and, currently, operator intervention is required to avoid and/or remove such tangles, potentially endangering the safety of the operator. This is especially problematic when dealing with difficult to machine and/or dangerous materials, such as pyrophoric and radioactive materials that must be machined under fluids, in gloveboxes, etc. In addition, large piles of tangled chips pose a disposal problem.

Various solutions have attempted to combat this problem and promote chip breaking, including modifying the geometry of the cutting tool, using external fixtures to vibrate the cutting tool, and using high pressure cooling systems to blast chips away. The use of special cutting tool geometries creates stresses in the chips, causing them to break. However, these solutions are unreliable, especially in finish turning applications, due to the resultant chips' flexibility. Current analytical and empirical models are predictively insufficient, and the use of special cutting tool geometries is, essentially, trial and error. It is common that a chip breaker design that is very effective for one turning application is completely ineffective for another, very similar, turning application. Disadvantageously, the solutions tend to be part geometry and material specific. The use of external devices retrofitted to the existing cutting tool to mechanically oscillate the cutting tool tip in and out of the cut in the feed direction is feasible, but problematic. This solution only works when machining an external part geometry that is aligned with the axes of the machine (e.g., an outer diameter or a face) and does not permit the fabrication of either outer or inner contour surfaces. It also fails to synchronize the oscillation of the cutting tool tip with the spindle speed (sometimes resulting in a continuous chip), it consumes workspace, and it reduces the stiffness of the cutting process, resulting in a poor quality surface finish. The use of a high pressure coolant stream directed at the tool-chip interface is only viable for processes with stable chip formation, and has limited effectiveness in contour turning applications with a complex moving tool-chip interface.

What is still needed in the art, however, are methods and systems in which toolpaths are chosen dynamically or non-dynamically, responsive to the cutting conditions present such that short chips are created. Preferably, these methods and systems may be utilized in turning applications, boring applications, as well as others.

BRIEF SUMMARY OF THE INVENTION

In various exemplary embodiments, the present invention utilizes dynamically or non-dynamically programmable toolpaths to create short chips, regardless of the cutting conditions present. Machine tool axes capabilities are utilized, not only to position the cutting tool in relation to the workpiece, but also to generate motion that results in short chips. This eliminates the problem of operator exposure to dangerous, and potentially hazardous, materials during the manual chip removal process, reduces the temperature of the cutting tool, and enhances the ability to implement automated manufacturing cells.

In one exemplary embodiment, the present invention provides a computer numerical control (CNC)-based method for chip breaking and the like in turning, boring, and other applications, including: engaging a workpiece with a cutting tool in a feed direction along a toolpath; and superimposing an oscillation in the feed direction on the toolpath such that one or more interrupted cuts and one or more chips are produced. The workpiece comprises an axis. The feed direction is one or more of parallel to, perpendicular to, and disposed at an angle to the axis of the workpiece. The oscillation superimposed in the feed direction on the toolpath includes a waveform selected from the group consisting of a sinusoidal waveform, a regular waveform, an irregular waveform, and a random waveform. The method also includes varying a phase of the waveform with one or more of time and workpiece position. The method further includes dynamically or non-dynamically varying the oscillation superimposed in the feed direction on the toolpath. Dynamically or non-dynamically varying the oscillation superimposed in the feed direction on the toolpath includes dynamically or non-dynamically varying one or more of an amplitude, a frequency, and a phase of the oscillation superimposed in the feed direction on the toolpath.

Dynamically or non-dynamically varying the oscillation superimposed in the feed direction on the toolpath also includes dynamically or non-dynamically varying the oscillation superimposed in the feed direction on the toolpath based on one or more of an inputted spindle speed, oscillation frequency, oscillation amplitude, cutting tool feed rate, workpiece geometry, part geometry, chip length, probability of producing a predetermined chip length, controller characteristic, machine characteristic, thermal consideration, cutting tool characteristic, part surface texture, residual stress factor, and fatigue life factor. The toolpath is selected responsive to a part surface resulting from a previous toolpath. Optionally, the method is utilized to one or more of control cutting tool wear, manage cutting temperature, create a structured surface, and improve a surface finish.

In another exemplary embodiment, the present invention provides a computer numerical control (CNC)-based system for chip breaking and the like in turning, boring, and other applications, including: a cutting tool for engaging a workpiece in a feed direction along a toolpath; and a controller for superimposing an oscillation in the feed direction on the toolpath such that one or more interrupted cuts and one or more chips are produced. The workpiece comprises an axis. The feed direction is one or more of parallel to, perpendicular to, and disposed at an angle to the axis of the workpiece. The oscillation superimposed in the feed direction on the toolpath includes a waveform selected from the group consisting of a sinusoidal waveform, a regular waveform, an irregular waveform, and a random waveform. The system also includes an algorithm for varying a phase of the waveform with one or more of time and workpiece position. The system further includes an algorithm for dynamically or non-dynamically varying the oscillation superimposed in the feed direction on the toolpath. Dynamically or non-dynamically varying the oscillation superimposed in the feed direction on the toolpath includes dynamically or non-dynamically varying one or more of an amplitude, a frequency, and a phase of the oscillation superimposed in the feed direction on the toolpath. Dynamically or non-dynamically varying the oscillation superimposed in the feed direction on the toolpath also includes dynamically or non-dynamically varying the oscillation superimposed in the feed direction on the toolpath based on one or more of an inputted spindle speed, oscillation frequency, oscillation amplitude, cutting tool feed rate, workpiece geometry, part geometry, chip length, probability of producing a predetermined chip length, controller characteristic, machine characteristic, thermal consideration, cutting tool characteristic, part surface texture, residual stress factor, and fatigue life factor. The toolpath is selected responsive to a part surface resulting from a previous toolpath. Optionally, the system is utilized to one or more of control cutting tool wear, manage cutting temperature, create a structured surface, and improve a surface finish.

In a further exemplary embodiment, the present invention provides a computer numerical control (CNC)-based method for chip breaking and the like in turning, boring, and other applications, including: engaging a workpiece with a cutting tool in a feed direction along a first toolpath segment; and engaging the workpiece with the cutting tool in the feed direction along a second toolpath segment; wherein an interaction of the first toolpath segment and the second toolpath segment results in one or more interrupted cuts and one or more chips being produced. Optionally, the method is utilized to one or more of control cutting tool wear, manage cutting temperature, create a structured surface, and improve a surface finish.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

The detailed description below summarizes the systems and methods of the present invention in an evolving manner.

Initially, simplified cases and solutions are provided to illustrate the basic concepts involved, and more rudimentary techniques. Subsequently, more complicated cases and solutions are provided to illustrate the more advanced concepts involved, and more elegant techniques. It will be readily apparent to those of ordinary skill in the art that different solutions may be preferred in different cases, and various solutions may be combined with one another, as appropriate to the situation. All solutions are exemplary in nature, and should not be construed as limiting in any way.

Figure 1:
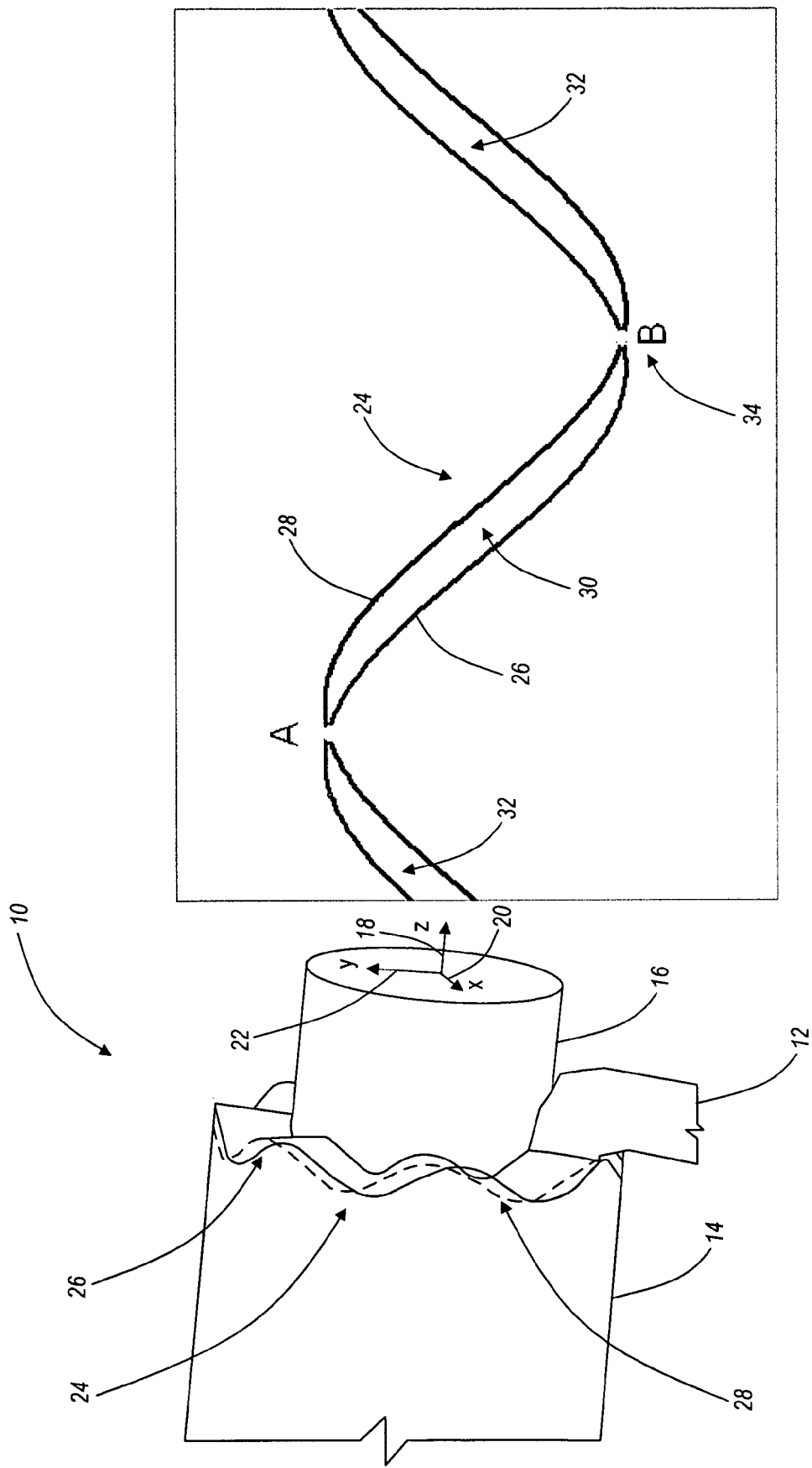
FIG. 1 is a schematic diagram and a plot illustrating one exemplary embodiment of the chip breaking system/method of the present invention.

Referring to FIG. 1, in one exemplary embodiment, the chip breaking system 10 of the present invention includes a cutting tool 12 that selectively engages a workpiece 14 in order to remove material, resulting in a finished part 16. The workpiece 14 and finished part 16 rotate around an axis 18 (labeled as the Z-axis in the example illustrated). The cutting tool 12 is selectively moved along this axis 18, in the feed direction. The cutting tool 12 may also be selectively and simultaneously moved along another axis 20, 22 (labeled as the X and Y-axes in the example illustrated), again in the feed direction, in order to form an end of the finished part 16, etc. An oscillation is selectively superimposed on the toolpath 24, in the feed direction, in order to create an interrupted cut and a broken chip. The waveform introduced is varied dynamically or non-dynamically, such that the currently cut "wavy surface" and the previously cut "wavy surface" interact during each rotation of the workpiece 14 and finished part 16, causing the thickness of the chip to selectively approach zero, causing the chip to break. FIG. 1 illustrates the current toolpath 26, the previous toolpath 28, periods 30 when the tool is engaged and material is removed, and periods 32 when the tool is not engaged and material is not removed. This transition 34 from material removal to material non-removal creates the interrupted cut and the broken chip. It should be noted, as is described in greater detail herein below, that any suitable varying waveform, or irregular or random pattern, may be utilized to create an interrupted cut and a broken chip.

Figure 2:
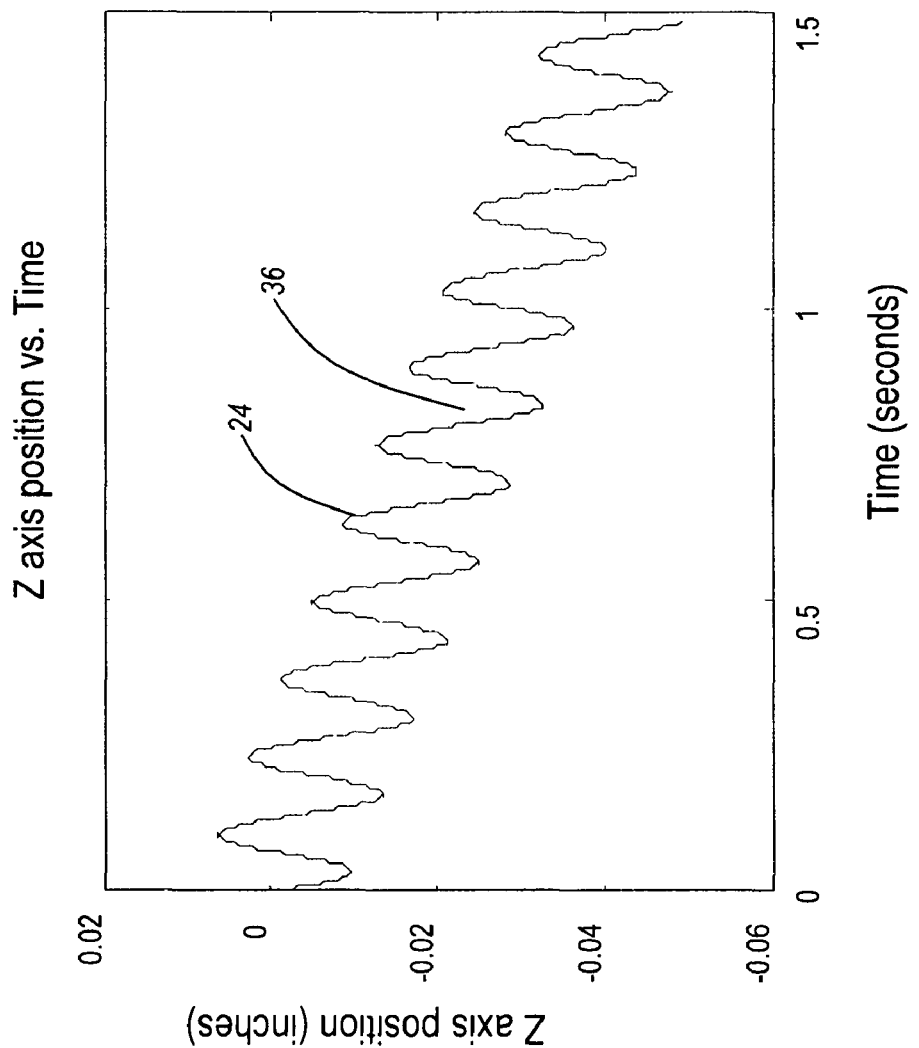
FIG. 2 is a plot illustrating the Z-axis position of a cutting tool vs. time utilizing the chip breaking system/method of FIG. 1.

FIG. 2 is a plot illustrating the Z-axis position of a cutting tool vs. time utilizing the chip breaking system/method of FIG. 1, the plot illustrating the motion of the cutting tool 12 for an outer diameter (OD) turning application, and essentially unwrapping the toolpath 24 from the surface of the finished part 16 (FIG. 1). The dotted line is a conventional toolpath 36 that provides constant advancement of the cutting tool 12 in the Z direction. The slope of the dotted line is the feed per revolution, $f_r$, or feed rate. The solid line, or toolpath 24, illustrates how a sine wave of predetermined oscillation amplitude, A, and oscillation frequency, $\omega$, is selectively superimposed on the conventional toolpath 36. It should be noted that, in the example illustrated, the X-axis position of the cutting tool 12 (FIG. 1) (and the diameter of the finished part 16) remains constant throughout the entire cut, because the oscillation occurs only in the feed direction. In order to achieve broken chips, the relationship between the oscillation amplitude, A, and the feed rate, $f_r$, for a given oscillation frequency, $\omega$, is important in this example because the phase of the tool oscillation is constant for a given spindle and oscillation speed when machining a cylinder. For facing operations, the phase changes continuously. As described in greater detail herein below, the phase of the tool oscillation is also important when machining more complex geometries.

Again, it should be noted, as is described in greater detail herein below, that any suitable varying waveform, or irregular or random pattern, may be utilized to create an interrupted cut and a broken chip. The calculations necessary to generate chip breaking toolpaths often fall into two categories: 1) linear toolpaths including outer and inner diameters, tapers, and facing operations; and 2) curvilinear toolpaths including radii up to a full hemisphere. A method is also disclosed herein that allows for the generation of a chip breaking toolpath regardless of geometry.

Figure 3:
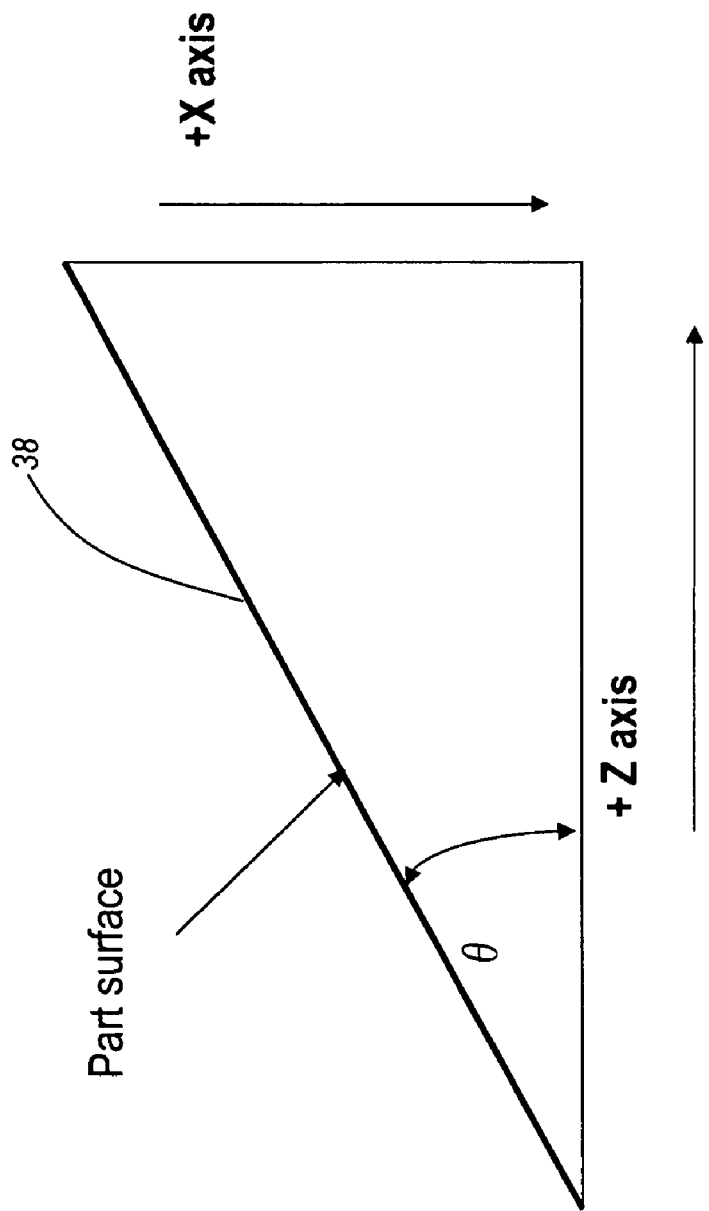
FIG. 3 is a schematic diagram illustrating the calculation of linear chip breaking toolpaths utilizing the chip breaking system/method of FIG. 1.

For linear turning applications, theta, $\theta$, is defined as illustrated in FIG. 3 with respect to the part surface 38. For a sine wave, for example, the machine axes coordinates, Z and X, are expressed in equations (1) and (2), as follows:

$$Z_{position} = -\cos(\theta)[(A\sin(\omega t)) + (f_r S_{rpm} t/60)] - Z_i \quad (1)$$

$$X_{position} = 2\sin(\theta)[(A\sin(\omega t)) + (f_r S_{rpm} t/60)] + D_i \quad (2)$$

where A=amplitude of oscillation, $\omega$=frequency of oscillation in radians per second, t=time in seconds, $f_r$=feed per revolution, $S_{rpm}$=spindle speed in revolutions per minute, $Z_i$=initial Z position, $D_i$=initial diameter, $(A\sin(\omega t))$ is the oscillation component, and $(f_r S_{rpm} t/60)$ is the feed component. For a constant (outer or inner) diameter turning application, $\theta=0°$, the Z axis coordinates have both the oscillation component and the feed component. The resultant Z axis motion is illustrated in FIG. 2. In contrast, because $\sin(0)=0$, and the feed per revolution is in the Z direction, the X axis coordinates remain at a constant value of $D_i$. For a facing operation, $\theta=90°$, the X axes coordinates have both the oscillation component and the feed component, while the Z axis coordinates remain at a constant value of $Z_i$. Finally, any other value of $\theta$ yields a tapered surface. In this case, both the Z and X axes coordinates have both the oscillation component and the feed component. Once the machine axes coordinates, Z and X, are calculated with an operator defined distance between points, they are output to a part program along with setup code for the machine.

Figure 4:
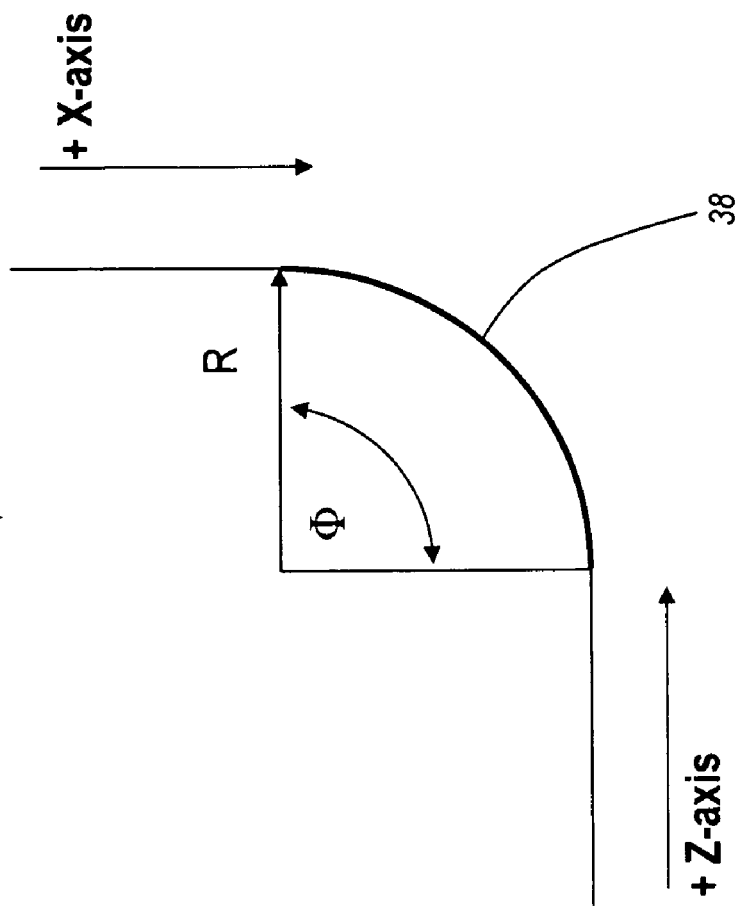
FIG. 4 is a schematic diagram illustrating the calculation of curvilinear chip breaking toolpaths utilizing the chip breaking system/method of FIG. 1.

For curvilinear turning applications, the toolpath along the part surface 38 may be calculated using two different exemplary methods, with the same final result. In the first exemplary method, a point to point interpolation is made to define the contour and, therefore, output the toolpath as individual points. In the second exemplary method, a polar coordinate method is used to define the toolpath coordinates. Consider an OD part with a corner radius, for example, as illustrated in FIG. 4 (it should be noted that a constant radius part is illustrated, but similar principles would apply to a variable radius part as well). As the cutting tool transitions from facing to the radius, the toolpath follows the contour oscillating along the part surface 38. The part surface 38 is defined in cylindrical coordinates, with R being the radius and ($\Phi$) being the total angle of the part surface 38. As a result, the cutting tool oscillates back and forth in the $\Phi$ direction. Equation (3) provides the formulation of the oscillating toolpath in cylindrical coordinates by calculating the position of $\Phi$ along R, as follows:

$$\Phi_{position} = 1/R[(A\sin(\omega t)) + (f_r S_{rpm} t/60)] + \Phi_i \quad (3)$$

where $\Phi_i$=initial position in radians. As before, $(A\sin(\omega t))$ is the oscillation component and $(f_r S_{rpm} t/60)$ is the feed component. The machine position is calculated in cylindrical coordinates with operator defined spacing between points, R and $\Phi$. These positions are then converted into coordinates that the machine understands, X and Z, as follows:

$$X_{position} = D_i + 2R\sin(\Phi) \quad (4)$$

$$Z_{position} = R\cos(\Phi) - R \quad (5)$$

For chip breaking to occur using equations 1-5, it is important to properly select two parameters: the oscillation frequency, which dictates the length of the chip, and the ratio of the oscillation amplitude to the feed rate, $R_{Af} = A/f_r$, which determines if and when the chip will break. The oscillation frequency that produces the desired chip length is as follows:

$$\omega = 2\pi V_c/5L \tag{6}$$

This equation (6) simply states that the velocity of the chip flowing off of the workpiece (surface speed in feet per minute, $V_c$) divided by the desired length of the chip in inches, L, is the frequency in radians per second, $\omega$. The equation is based on two assumptions: 1) exactly one chip is produced for each cycle of the oscillation; and 2) the first pass creates the entire surface that the second pass will encounter. In this case, the phase shift between these two passes is not purposefully controlled. It should be noted that this assumption is eliminated in other methodologies described in greater detail below.

In reality, in most cases, one chip is produced in less than one oscillation of the cutting tool due to interactions with the surface cut on a previous pass of the cutting tool. Additionally, when the phase is not controlled, a range of chip lengths are created during the cutting process. Equation 6 is modified to account for this in equation (7) by introducing a new variable, $P_{chip}$, the average percentage of one oscillation that produces a chip, as follows:

$$\omega = (2\pi V_c/5L)(P_{chip}/100) \tag{7}$$

The purpose of introducing this new variable, $P_{chip}$, is to aid in identifying a frequency, $\omega$, which provides an operator defined average chip length. $P_{chip}$ has a maximum of 100 (i.e. a continuous chip) and a minimum of 50 (i.e. the minimum length for one chip is half of one oscillation). The percentage of one oscillation that produces a chip, $P_{Chip}$, varies based on $R_{Af}$ (a combination of the oscillation amplitude, A, and the feed rate, $f_r$) and the phase shift between consecutive passes of the cutting tool. The selection of the feed rate is typically dictated by a conventional non-chip breaking turning application for a given material and given cutting conditions.

Figure 5A:
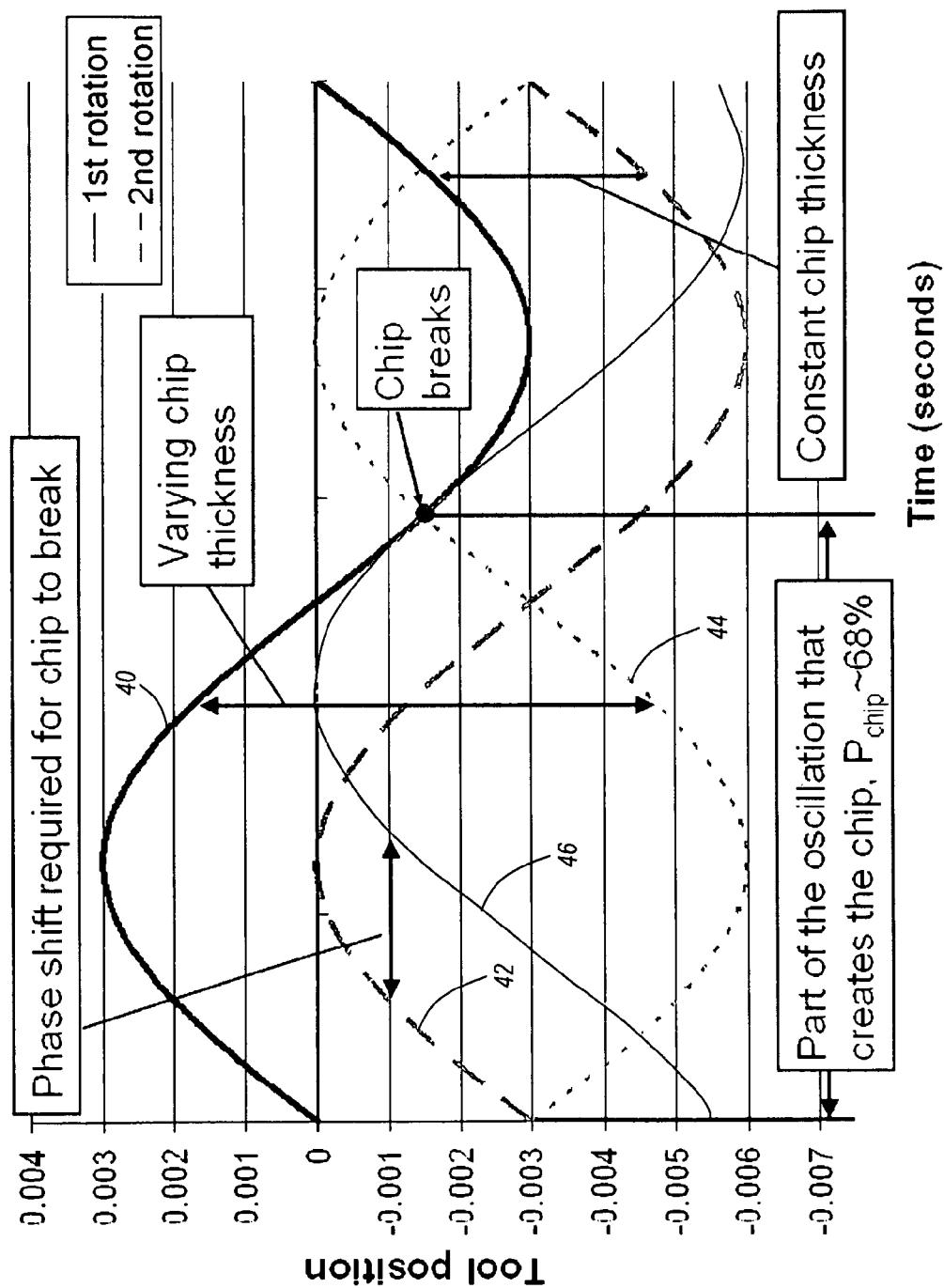
FIG. 5 is a pair of plots illustrating the effect of oscillation amplitude and phase shift on chip breaking for a given feed utilizing the chip breaking system/method of FIG. 1.
Figure 5B:
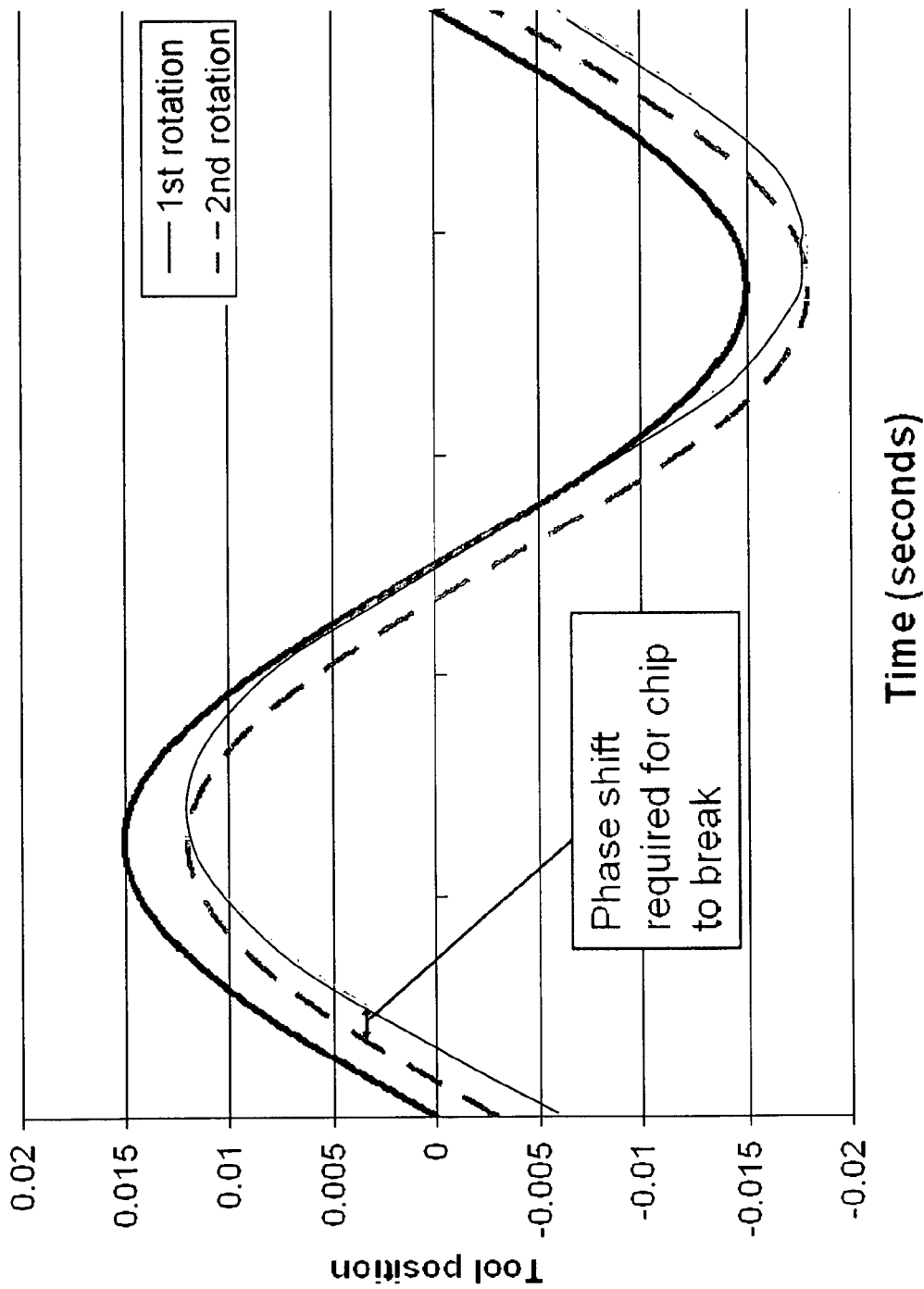

We now turn to a consideration of the effects of oscillation amplitude and phase shift on the methodologies of the present invention. FIG. 5 illustrates the effect of oscillation amplitude and phase shift on chip breaking for a given feed (0.003 inches) for a) $R_{Af}=1$ and b) $R_{Af}=5$. The plots illustrate the position of the cutting tool for two rotations of the workpiece. In this case, there are three primary factors that affect the chip breaking process, the phase between the two consecutive surfaces, the oscillation amplitude, and the amplitude to feed ratio, $R_{Af}$. FIG. 5a illustrates the original part surface 40 and three variations of the second pass of the cutting tool 42, 44, 46 with different phase shifts, of 0, 3.14, and 1.05 radians, respectively. It is clear from these plots that an oscillation amplitude much greater than the feed, see FIG. 5b, is more likely to produce a broken chip because only a slight change in the phase shift causes the two passes to intersect. On the other hand, FIG. 5a illustrates that, for the case where the amplitude equals the feed, there is a wide range of phase shifts that result in no intersection of the two passes, and, therefore, a continuous chip. A range of phase shift values are considered, in this specific case, for two reasons: 1) the phase shift is not directly calculated or prescribed; and 2) to account for the uncertainty in the ability of the machine to synchronize the spindle speed and axes drive motors for the duration of the cut. When there are more cycles of the tool motion per revolution, the phase that appears becomes more sensitive to the exact spindle speed and oscillation frequency.

Figure 6:
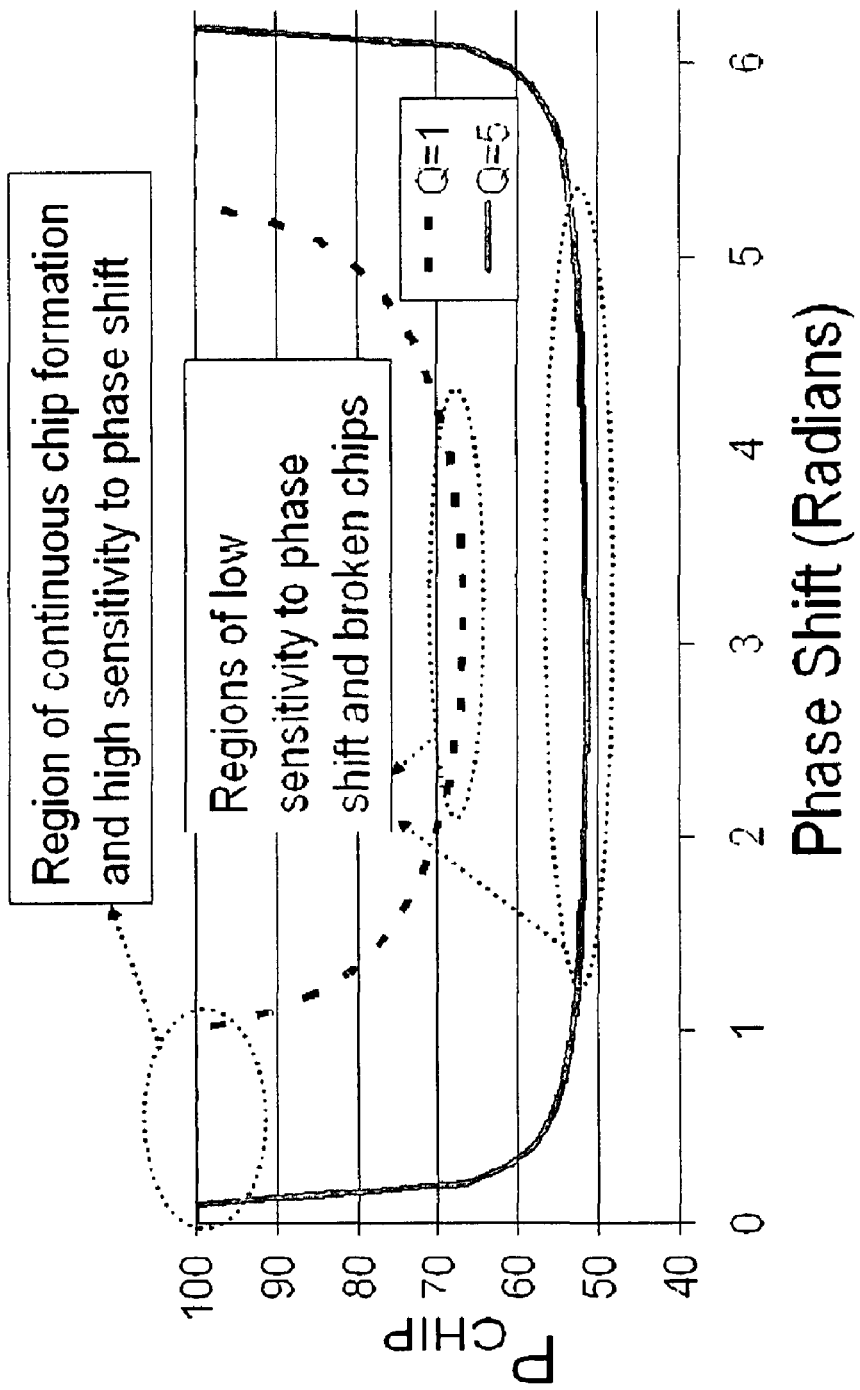
FIG. 6 is a plot illustrating the average percentage of one oscillation that produces a chip vs. the phase shift, highlighting the sensitivity of chip breaking to the ratio of the oscillation amplitude to the feed rate, utilizing the chip breaking system/method of FIG. 1.

Considering a phase shift of $\pi$, illustrated in FIG. 5a, the cutting tool is engaged with the workpiece for a large percentage of the oscillation, $P_{chip}$ ~68%. However, the value of $P_{chip}$ varies with the phase shift. The percentage of one oscillation that produces a broken chip over the range of all possible phase shifts is illustrated in FIG. 6. Both FIGS. 5 and 6 illustrate that a phase shift of zero, independent of oscillation amplitude, results in $P_{chip}=100$, and a continuous chip.

Figure 7:
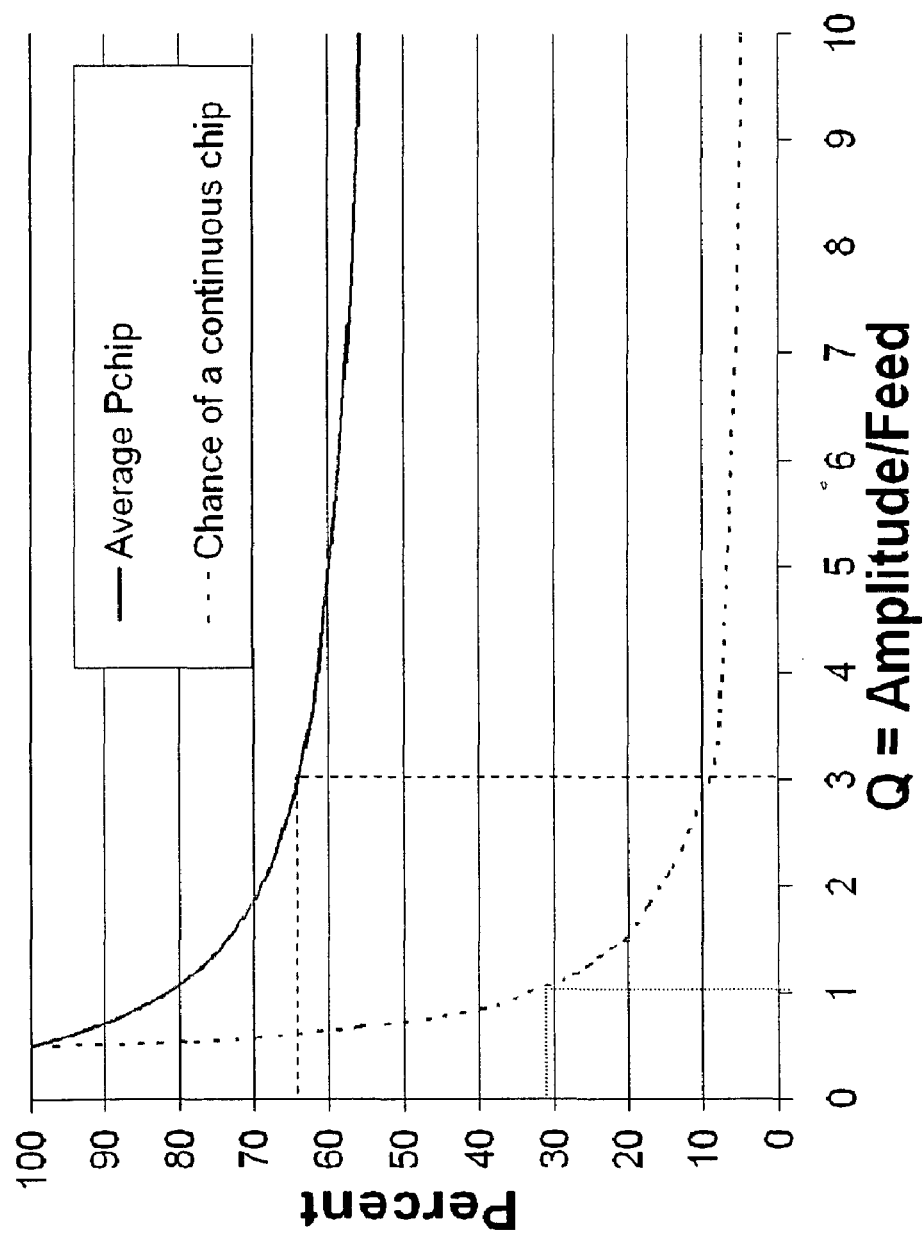
FIG. 7 is a plot illustrating the average percentage of one oscillation that produces a chip and the probability of obtaining a continuous chip vs. the ratio of the oscillation amplitude to the feed rate utilizing the chip breaking system/method of FIG. 1.

When using this method, the phase shift between two surfaces is initially unknown; therefore, an average value for $P_{Chip}$ is taken for each value of $R_{Af}$. FIG. 7 illustrated the average $P_{chip}$ values for a range of potential $R_{Af}$ values and the probability of obtaining a continuous chip as a function of $R_{Af}$. For the case of $R_{Af}=1$, on average, 80% of one oscillation makes the chip and $P_{chip}=100$ from 0-1 radians, and again from 5.28-6.28 radians. This equates to a 33% chance of a continuous chip. Alternatively, for the case of $R_{Af}=5$, the likelihood of obtaining a continuous chip is reduced to 7.9%. It should be noted that, when $R_{Af}<\frac{1}{2}$, it is impossible for chips to break because the oscillation amplitude is not large enough to bring the tool back out of the workpiece, regardless of the phase shift.

Experiments were performed utilizing a commercially available lathe. Chip breaking facing cuts were performed in both aluminum 6061 (cut dry) and 304 stainless steel (cut with coolant). The chip breaking toolpaths included OD turnings and tapers, ID turnings, and curvilinear toolpaths. All tests were performed with triangular inserts (TNG-322) with no chip breaking geometries, and held by an insert holder with a three degree negative rake (MTJNR 12-3b). All tests were finish turning applications with a 0.005 inch depth of cut.

Figure 8:
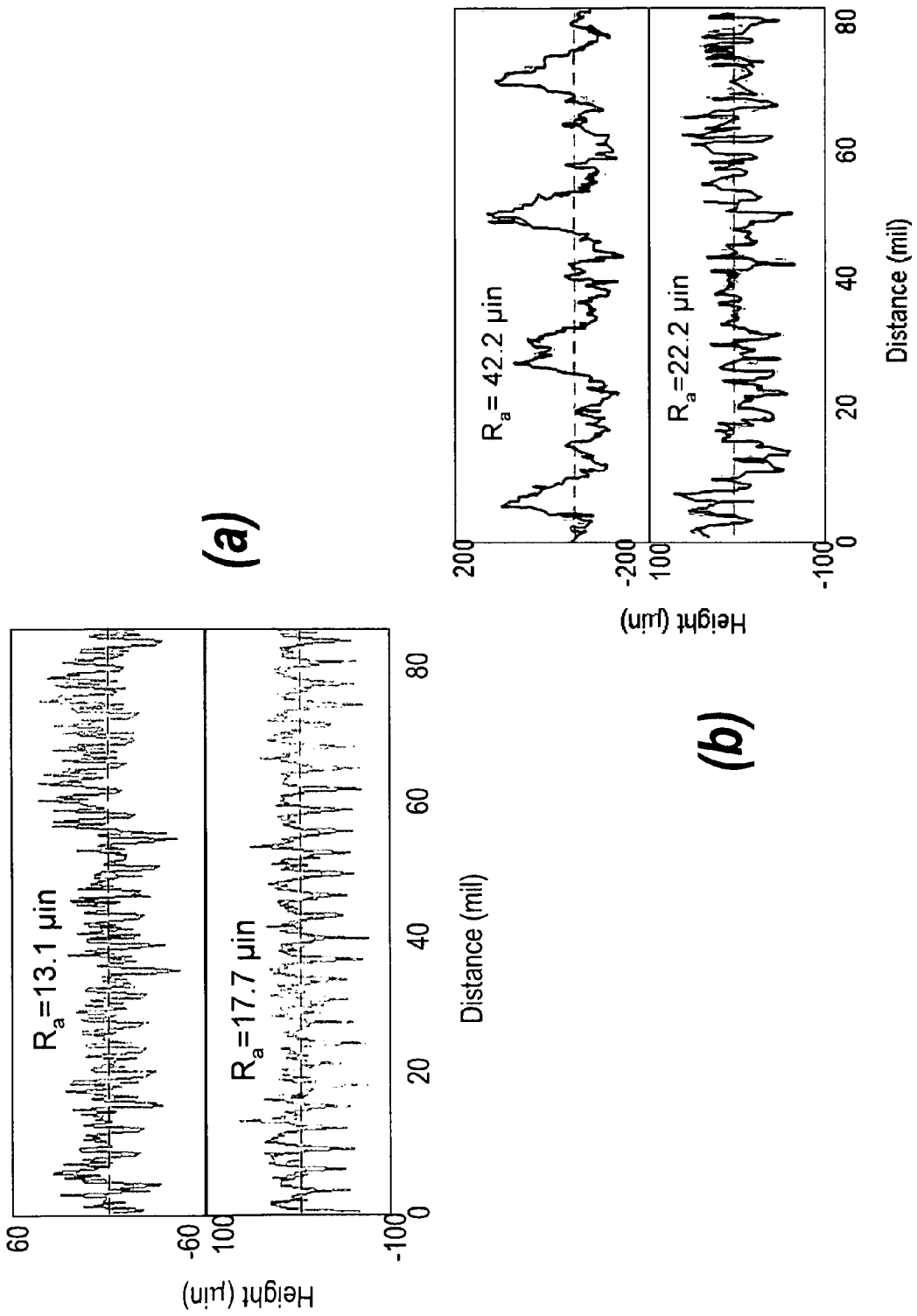
FIG. 8 is a pair of plots illustrating the surface finishes in 304 stainless steel for the outer perimeter and center of a part manufactured utilizing the chip breaking system/method of FIG. 1 and a conventional system/method, respectively.

Preliminary chip breaking toolpaths in both aluminum and stainless steel produced surfaces that were of both higher and lower quality when compared to conventional toolpaths. Two sets of surface finish measurements taken from a facing cut on a 3.75 inch diameter stainless steel workpiece are illustrated in FIG. 8. Surface finish measurements were made using a Zygo NewView 5000 white light interferometer. The cutting parameters were a 0.005 inch depth of cut with a 0.003 inch feed per revolution. The chip breaking toolpath created two-inch long chips with $R_{Af}=3$. The conventional toolpath produced an unbroken chip. The surface measurements from FIG. 5a were taken near the outer diameter of the part while the surface measurements from FIG. 8b were taken near the inner diameter of the part. In FIG. 5a, for the conventional toolpath, typical feed marks are observed, resulting in a surface finish of 17.7 µin, while, for the chip breaking toolpath, the surface finish is improved (Ra=13.1 µin). The feed marks that are typical in turning applications are essentially "wiped down" by the oscillatory motion of the tool, creating an improved surface finish when the systems/methods of the present invention are utilized. In FIG. 8b, the surface finish deteriorated near the inner diameter for both toolpaths, and the feed marks are less distinct for the conventional toolpath, giving a surface finish of 22.2 µin. It was observed that in the chip breaking toolpath, the "wiper" effect is present, but the backward motion of the tool removes some, but not all, of the previous marks, giving a surface finish of 42.2 µin. This is likely because the frequency of oscillation creates more than one oscillation per revolution at the outer diameter, which allows the tool to move back over all previous feed marks. Conversely, near the inner diameter, because the spindle speed increases (due to a constant surface speed), one oscillation was produced for multiple rotations of the spindle. This results in the tool removing some, but not all, of the previous feed marks. This issue is solved by adjusting the chip breaking parameters for different regions of the part. Thus, with the proper choice of chip breaking parameters, the surface finish may be fine tuned or tailored to an operator defined value.

Figure 9:
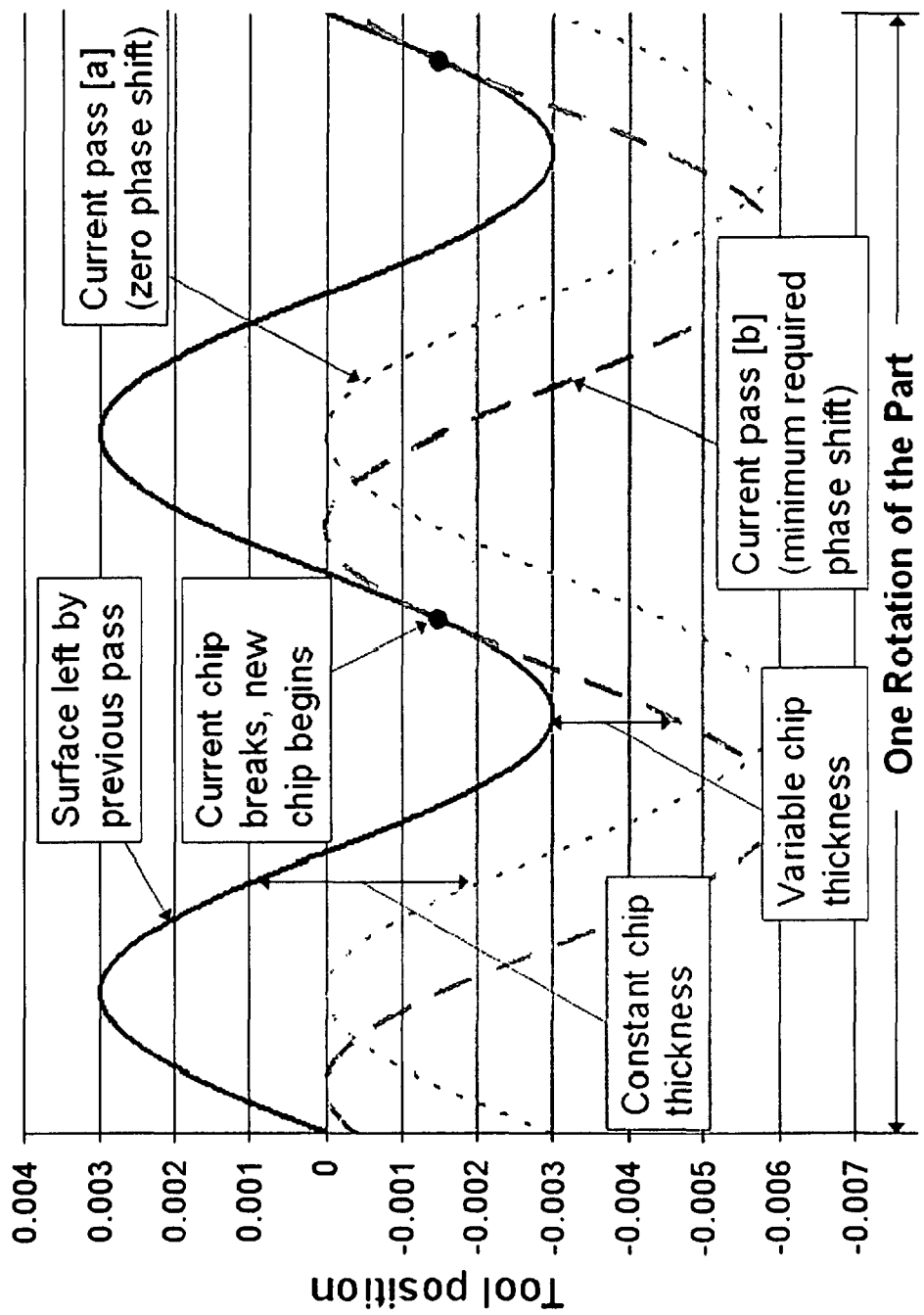
FIG. 9 is a plot illustrating a toolpath for two consecutive part rotations, in one case highlighting a zero phase shift with a continuous chip, and in another case highlighting the minimum required phase shift to produce a broken chip, utilizing the chip breaking system/method of FIG. 1.

In a more refined methodology, when creating chip breaking toolpaths, there are several parameters that must be set, including: 1) the amplitude ratio, $R_{Af}$, defined as the ratio between the oscillation amplitude, A, and the feed, $f_r$, giving $R_{Af}=A/f_r$; 2) the oscillation frequency, $\omega$; 3) the phase shift, $\epsilon$, between the part surface being cut and the previous part surface; and 4) the chip length, an operator input parameter that affects the choice of the previous three parameters. For a given oscillation frequency, $\omega$, the combination of the amplitude ratio, $R_{Af}$, and the phase shift, $\epsilon$, determines the chip length. FIG. 9 illustrates that the phase shift, $\epsilon$, is critical. Even for large amplitudes of motion, if the phase shift, $\epsilon$, is zero, the two part surfaces will not intersect and an interrupted cut will not be created.

Figure 10:
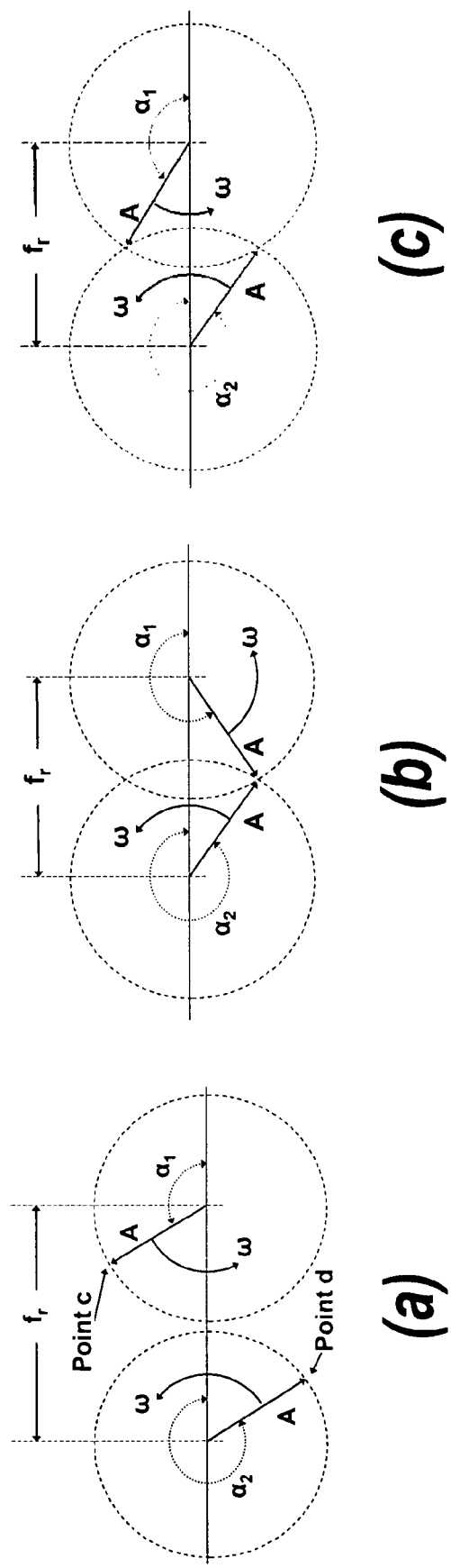
FIG. 10 is a series of plots illustrating the vector relationship between two subsequent toolpaths, where a) regardless of the amplitude ratio a chip will not break; b) the minimum phase shift requirement is met and a chip will break; and c) the difference between the feed components of the vectors equals zero and a chip will break utilizing the chip breaking system/method of FIG. 1.
Figure 11:
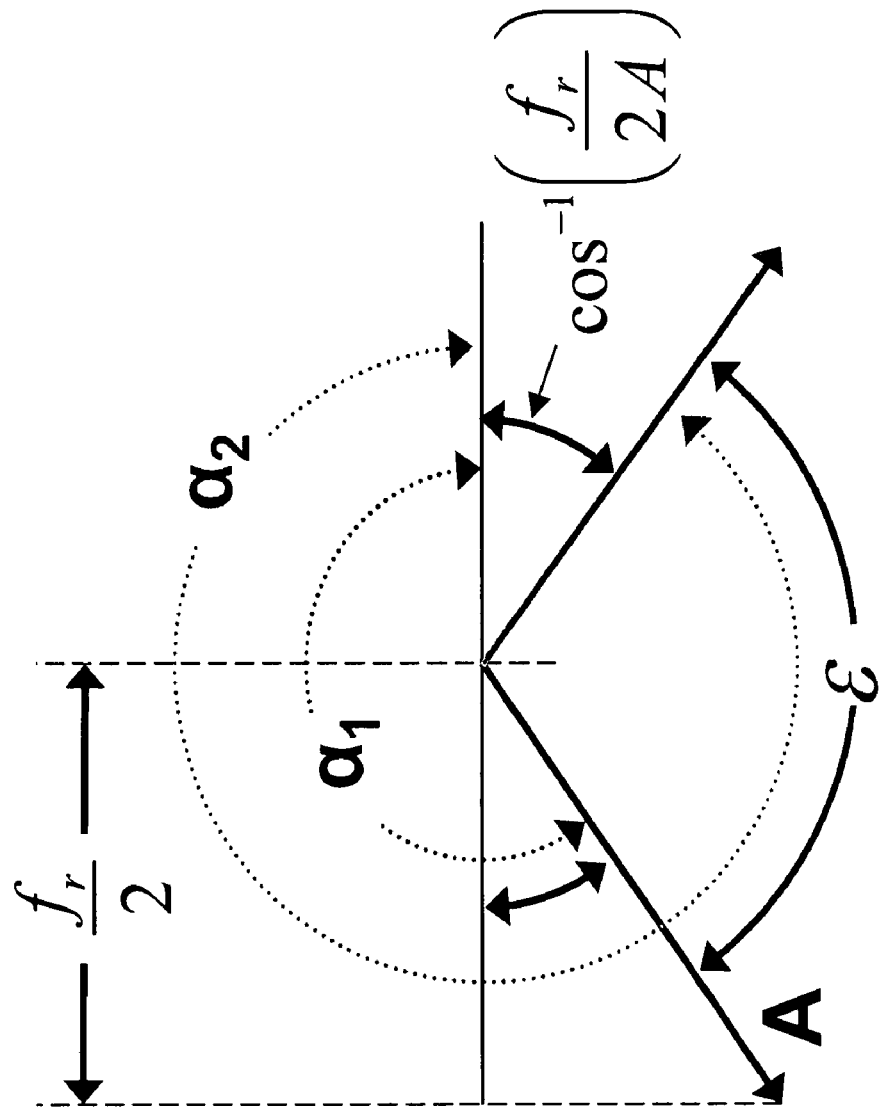
FIG. 11 is a plot illustrating the trigonometric relationship between two subsequent toolpaths utilizing the chip breaking system/method of FIG. 1.

The sinusoidal portion, or oscillation, of the toolpath may be represented as the rotation of a vector around a point, where the length of the vector is equal to the oscillation amplitude, A. The linear feed portion of the toolpath may be represented as a translation of the center point of the vector a distance equal to the feed per revolution. The angle between the zero and the moving vector is the instantaneous phase of the vector. FIG. 10 is a snapshot at a given point in time, where the vector on the left is the current pass of the tool and the vector on the right is the toolpath on the same point of the workpiece one pass prior. The phase shift between two subsequent passes of the tool is $\alpha_2-\alpha_1$, which is a function of the oscillation amplitude, A, and the amount of feed per revolution, $f_r$. The chip breaks only when the difference between the feed component of the two vectors is zero, as shown in FIGS. 10b and 10c. The relationship between the phase shift and the amplitude ratio given in equation (8) is derived from the trigonometric relationship illustrated in FIG. 11:

$$\epsilon=\pi\pm 2\cos^{-1}(\frac{1}{2}R_{Af}) \quad (8)$$

Figure 12:
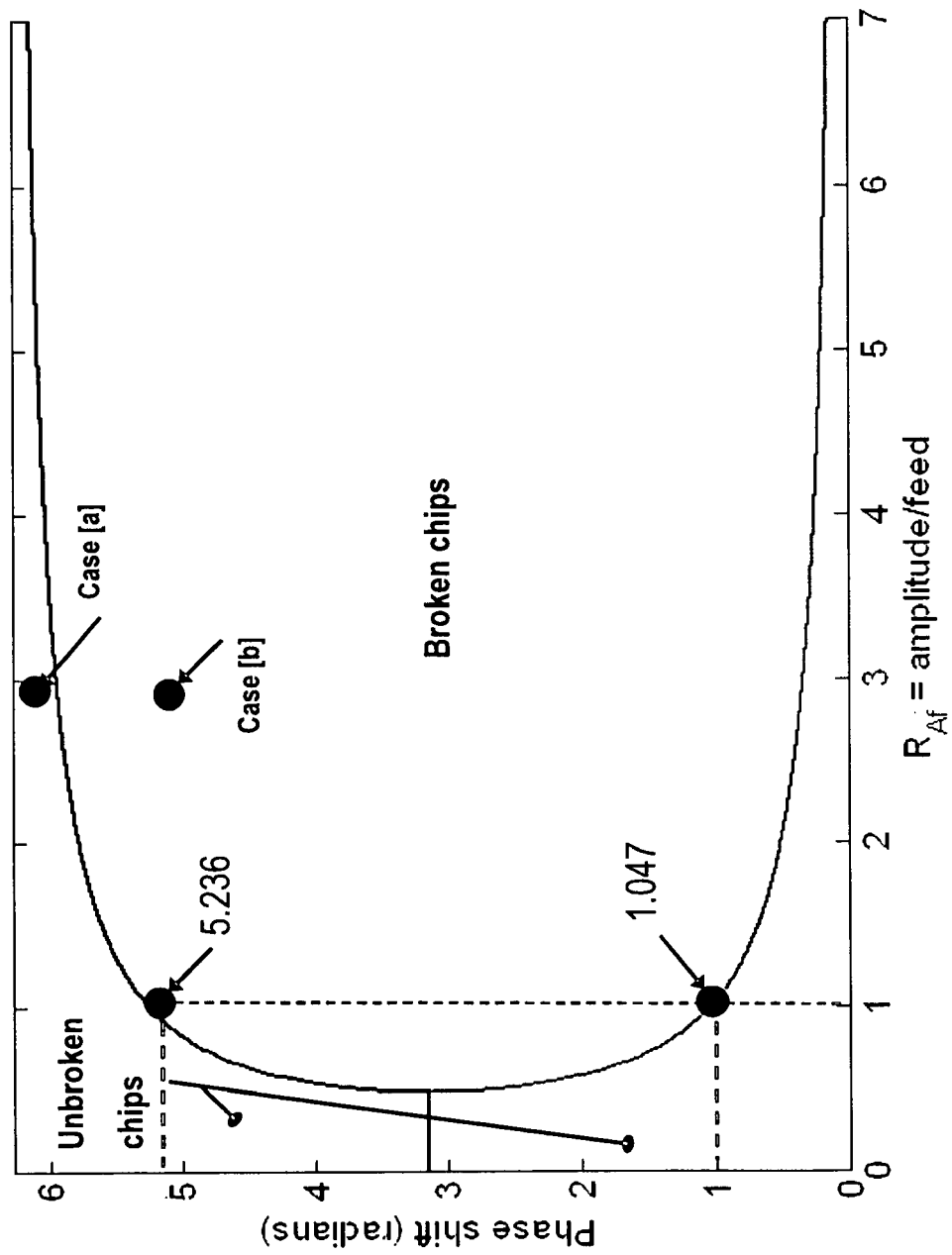
FIG. 12 is a plot illustrating the boundary limit between broken and unbroken chips utilizing the chip breaking system/method of FIG. 1.

Plotting the phase shift versus the amplitude ratio, FIG. 12 illustrates that there is a boundary defining the limit between the broken chip and unbroken chip regions. From FIG. 12 it is evident that, if $R_{Af}<0.5$ the chips will not break regardless of any other toolpath parameters. This case corresponds to FIG. 10a, where the oscillation amplitude is not great enough to overcome the amount the tool feeds forward per revolution. Therefore, the tool feeds forward into the workpiece at a faster rate than it retracts from the cut (which depends on A), never exiting the cut. Chips begin to break when $R_{Af}=0.5$, but only if the phase shift is 180°, or $\pi$ radians. As $R_{Af}$ increases, the range of phase shifts that produce broken chips increases. Essentially, the combination of a low feed rate and high amplitude (i.e. a larger $R_{Af}$) means there is a larger range of phase shifts that will produce broken chips but, as this ratio increases, the demand on the machine axes also increases, so a high value is not desirable. Additionally, once $R_{Af}\geq 2.0$ there is little value in increasing the ratio further because the boundary between broken and unbroken chips approaches a constant.

With the boundary limit between broken and unbroken chips defined, it is possible to choose toolpath parameters to respect these boundaries and set a nominal phase shift for a given chip breaking toolpath. The number of waves per revolution is an integer plus a fraction as given in equation (9). The fractional component of this equation, $\epsilon$, is the phase shift. Rearranging equation (9) gives the instantaneous phase shift, $\epsilon_i$, between two programmed tool passes, as follows in equation (10):

$$w_r=\omega/n=N+\epsilon_i/2\pi \quad (9)$$

$$\epsilon_i=2\pi(w_r-N) \quad (10)$$

where N is an integer equal to the whole number component of waves per revolution, n is the rotation frequency of the part, and $\omega$ is the oscillation frequency, both in radians per second.

Again, the phase shift boundary illustrated in FIG. 12 was partially validated by performing two cutting tests with conditions creating Case [a] and Case [b]. Case [a] had a phase shift of zero and, as the theory predicts, chips were produced that were unbroken. Case [b] had a nominal phase shift of 5.14 and the result was consistently broken chips.

Figure 13:
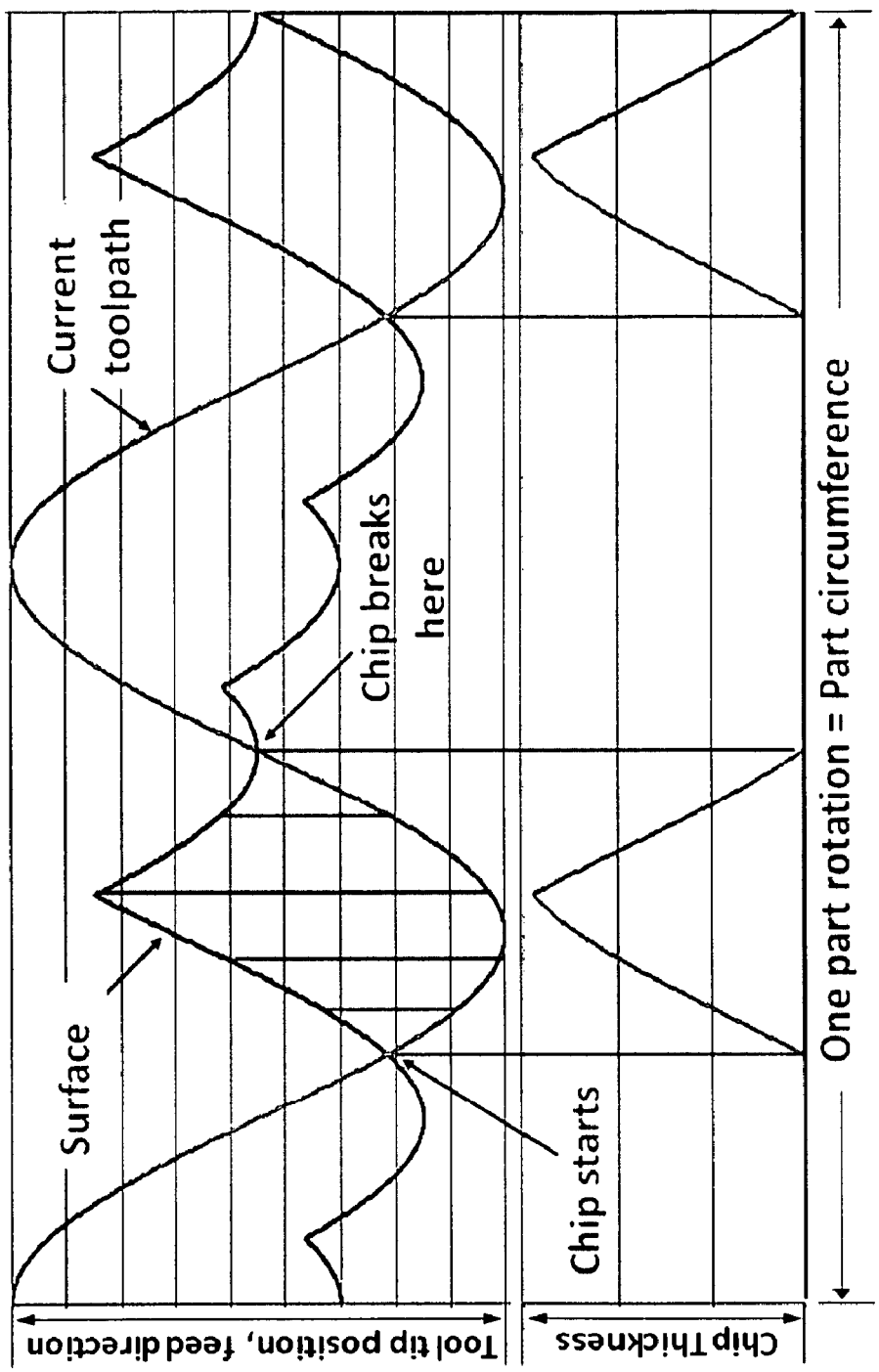
FIG. 13 is a plot illustrating chip length calculation from a time domain simulation, highlighting the actual cut surface of a part, a current toolpath, and a chip, utilizing the chip breaking system/method of FIG. 1.

An important characteristic to the operator is a defined maximum chip length so that chip control may be facilitated. It is desirable to predict the chip length for a range of cutting parameters, so that the choice of cutting conditions produces the desired chip length. To achieve this, a time domain simulation was created to compute the average chip length when changing the number of waves per revolution. The average chip length was calculated by keeping track of the chip thickness as it changed with time, as illustrated in FIG. 13. Since the rotational speed of the part is known, the angle of rotation of the part that creates one chip may be determined. Therefore, the uncut chip length for a given diameter part rotating at a set speed is calculated from equation (6), as follows:

$$L_c=r\theta \quad (11)$$

where $L_c$ is the chip length, r is the radius of the part, and $\theta$ is the angle of rotation of the part that creates one chip.

Figure 14:
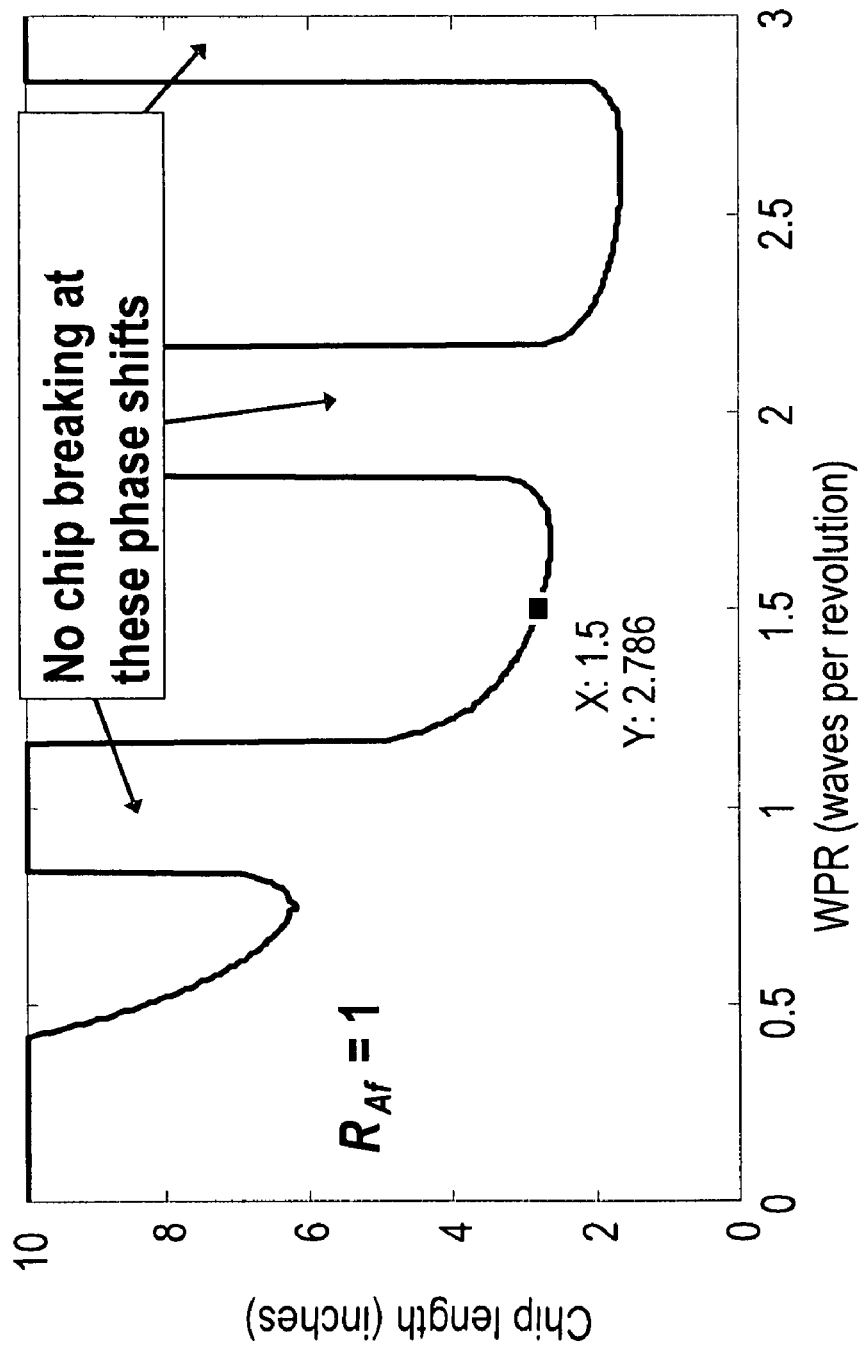
FIG. 14 is a plot illustrating chip length vs. the number of waves per revolution for a 2-inch diameter part with an amplitude ratio of one utilizing the chip breaking system/method of FIG. 1.

For example, given a 2-inch diameter part with 1.5 waves per revolution and an amplitude ratio of 1, one chip is created over an angle of 2.796 radians and, therefore, the uncut chip length is 2.8 inches. FIG. 14 illustrates the results of this simulation for a 2-inch diameter part with an amplitude ratio of 1. However, especially with high values of $R_{Af}$, the current surface is made up of toolpaths from multiple prior rotations. The time domain simulation keeps track of the actual surface geometry no matter when it was created, as shown in FIG. 13.

FIG. 14 (a plot of chip length vs. $w_r$ for a 2-inch diameter part with $R_{Af}=1$) illustrates that, for a low number of waves per revolution, it is difficult to obtain an uncut chip length shorter than approximately 6 inches (for a 2-inch diameter workpiece). However, as the frequency of oscillation increases, the chips get shorter. It can also be seen that the trend quickly converges; as a result a small number of waves per revolution create most of the benefit. This is fortunate because as the number of waves per revolution increases, so does the demand on the machine tool axes. The shape of the lobes changes as $R_{Af}$ increases.

Advantageously, toolpaths introduced in the present invention have other added benefits. For example, the intermittent contact between the cutting tool and the workpiece allows for the possibility of controlling the temperature of the cutting tool by appropriately selecting the contact time. This is particularly useful where rapid cutting tool wear is an issue, and for materials which are pyrophoric, for example.

Thus, it has been demonstrated that chip breaking using CNC toolpaths is a reliable alternative to other chip control methods currently in use. Using the basic and more advanced methodologies and techniques described above, chip breaking toolpaths for freeform shapes (i.e., non-constant radius curvilinear geometries) may be exploited. The basic calculations required for the creation of chip breaking toolpaths require computing power that is similar to what is currently done in the controller of the machine (i.e., cutter compensation, circular interpolation, etc.). Therefore it is likely that the controller may be able to provide chip breaking oscillations without the need for a separate part program. Finally, to help in the selection of chip breaking parameters, a set of standardized tests may be developed to evaluate the capabilities of the machine.

An advantage with chip breaking toolpaths is that, in many cases, they provide an average cutting temperature, and possibly a peak cutting temperature, that is less than a conventional process. As the tool is removed from the workpiece, the cutting edge has time to cool before it reenters the cut. The temperature of the tool has a significant effect on tool life, and for this reason, it is likely that with a decreased tool temperature, the tool life will increase. In some cases, tool life, and not chip removal, is the driving factor in selecting oscillating toolpaths. In extreme cases, difficult to machine materials require that the insert be changed while in the process of machining a part's feature. With the new insert fitted, unavoidable slight misalignments can cause problems with the part geometry.

As CNC machining becomes increasingly popular, part geometries are trending towards more complex shapes. These shapes are generally defined by a myriad of points that are fed into the controller one after another. These geometries present a challenge for chip breaking toolpaths because it is required that a chip breaking toolpath always oscillate in the feed direction without interfering with the part geometry. For successful implementation of chip breaking toolpaths on complicated geometries, a method of ensuring that gouging does not occur is required.

Figure 15:
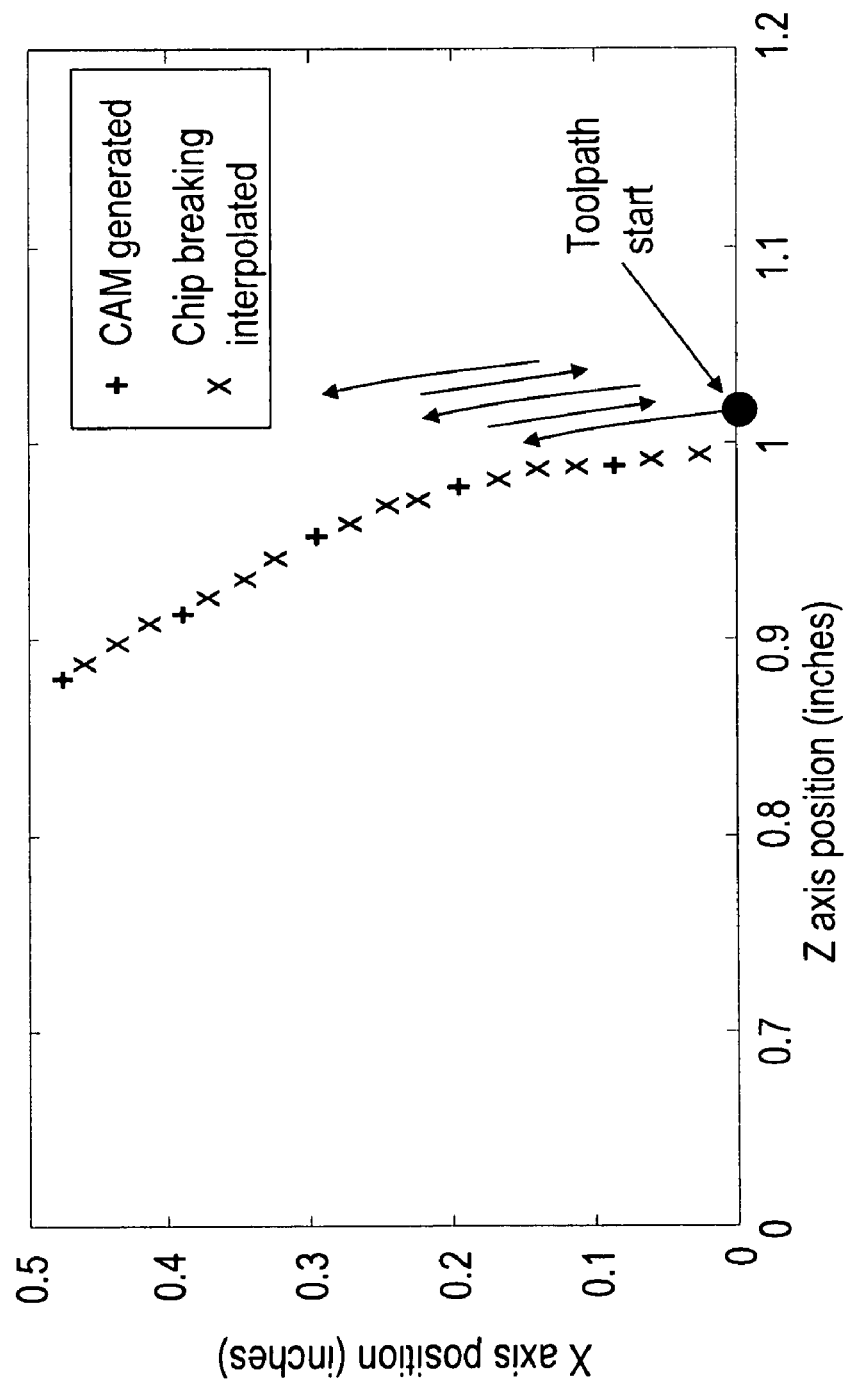
FIG. 15 is a plot illustrating a method for the creation of chip breaking toolpaths for geometries of variable radius.

One exemplary solution to this gouging problem is to use the CNC code points from a standard part program and interpolate between these points to create an oscillation moving forward a certain number of points then back a certain number of points. To create the chip breaking toolpath the user inputs two parameters (oscillation amplitude and frequency) and the point to point CNC code is generated by the CAM software. The toolpath creation program then interpolates between the points given by the CAM software to create a series of points. An example of how this would work is illustrated in FIG. 15. In this figure, the red pluses are the points that are generated by the CAM software, whereas the green x's are simply linear interpolations between the points. Using a linear distance calculation, the program is then able to create an oscillation by simply moving forward a certain number of points then back a specific number (less than the number of points moved forward), both of which can be defined by the oscillation amplitude and feed. The frequency of oscillation is created by commanding the machine to move between the points. This is nothing more than the total distance between all the points that make up one oscillation divided by the inverse of the oscillation frequency (oscillation period). Using this approach, a toolpath of given amplitude and frequency is created, resulting in the axes following the path as shown by the arrows in FIG. 15. For this method of toolpath creation, the geometry of the part is insignificant, because all that the chip breaking toolpath uses are the points in the program. For the example of a constant diameter toolpath with only a start point and an end point, interpolating between these points is just as effective as creating a separate program using the methods described above.

Using methods for creating chip breaking programs independent of part geometry, programs can be directly calculated in the controller without requiring external computing resources. One way to achieve this would be to create a chip breaking G code that requires inputs of both amplitude and frequency. Using these inputs, it is possible to then interpolate to create new points between the original points, and oscillate between these interpolations. Using controller integrated chip breaking codes also allows the process to run without chip breaking until it is sensed that an unmanageable chip is being formed.

Although the present invention has been illustrated and described herein with reference to preferred embodiments and specific examples thereof it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

The invention claimed is:

1. A computer numerical control-based method for chip breaking and the like in turning, boring, and other applications, comprising:
    engaging a workpiece with a cutting tool in a feed direction along a toolpath; and
    superimposing an oscillation in the feed direction on the toolpath such that one or more interrupted cuts and one or more chips are produced;
    wherein the oscillation is determined based on at least chip length, workpiece surface finish, and machine dynamic capability; and
    wherein a phase shift of the oscillation is varied between at least two successive rotations of the workpiece.

2. The method of claim 1, wherein the workpiece comprises an axis.

3. The method of claim 2, wherein the feed direction is one or more of parallel to, perpendicular to, and disposed at an angle to the axis of the workpiece.

4. The method of claim 1, wherein the oscillation superimposed in the feed direction on the toolpath comprises a waveform selected from the group consisting of a sinusoidal waveform, a regular waveform, an irregular waveform, and a random waveform.

5. The method of claim 4, further comprising varying the phase of the waveform with one or more of time and workpiece position.

6. The method of claim 1, further comprising dynamically or non-dynamically varying the oscillation superimposed in the feed direction on the toolpath.

7. The method of claim 6, wherein dynamically or non-dynamically varying the oscillation superimposed in the feed direction on the toolpath comprises dynamically or non-dynamically varying one or more of an amplitude, a frequency, and the phase of the oscillation superimposed in the feed direction on the toolpath.

8. The method of claim 6, wherein dynamically or non-dynamically varying the oscillation superimposed in the feed direction on the toolpath comprises dynamically or non-dynamically varying the oscillation superimposed in the feed direction on the toolpath based on one or more of an inputted spindle speed, oscillation frequency, oscillation amplitude, cutting tool feed rate, workpiece geometry, part geometry, chip length, probability of producing a predetermined chip length, controller characteristic, machine characteristic, thermal consideration, cutting tool characteristic, part surface texture, residual stress factor, and fatigue life factor.

9. The method of claim 1, wherein the toolpath is selected responsive to a part surface resulting from a previous toolpath.

10. The method of claim 1, wherein the method is utilized to one or more of control cutting tool wear, manage cutting temperature, create a structured surface, and improve a surface finish.

11. A computer numerical control-based system for chip breaking and the like in turning, boring, and other applications, comprising:
- a cutting tool for engaging a workpiece in a feed direction along a toolpath; and
- a controller for superimposing an oscillation in the feed direction on the toolpath such that one or more interrupted cuts and one or more chips are produced;
- wherein the oscillation is determined based on at least chip length, workpiece surface finish, and machine dynamic capability; and
- wherein a phase shift of the oscillation is varied between at least two successive rotations of the workpiece.

12. The system of claim 11, wherein the workpiece comprises an axis.

13. The system of claim 12, wherein the feed direction is one or more of parallel to, perpendicular to, and disposed at an angle to the axis of the workpiece.

14. The system of claim 11, wherein the oscillation superimposed in the feed direction on the toolpath comprises a waveform selected from the group consisting of a sinusoidal waveform, a regular waveform, an irregular waveform, and a random waveform.

15. The system of claim 14, further comprising an algorithm for varying the phase of the waveform with one or more of time and workpiece position.

16. The system of claim 11, further comprising an algorithm for dynamically or non-dynamically varying the oscillation superimposed in the feed direction on the toolpath.

17. The system of claim 16, wherein dynamically or non-dynamically varying the oscillation superimposed in the feed direction on the toolpath comprises dynamically or non-dynamically varying one or more of an amplitude, a frequency, and the phase of the oscillation superimposed in the feed direction on the toolpath.

18. The system of claim 16, wherein dynamically or non-dynamically varying the oscillation superimposed in the feed direction on the toolpath comprises dynamically or non-dynamically varying the oscillation superimposed in the feed direction on the toolpath based on one or more of an inputted spindle speed, oscillation frequency, oscillation amplitude, cutting tool feed rate, workpiece geometry, part geometry, chip length, probability of producing a predetermined chip length, controller characteristic, machine characteristic, thermal consideration, cutting tool characteristic, part surface texture, residual stress factor, and fatigue life factor.

19. The system of claim 11, wherein the toolpath is selected responsive to a part surface resulting from a previous toolpath.

20. The system of claim 11, wherein the system is utilized to one or more of control cutting tool wear, manage cutting temperature, create a structured surface, and improve a surface finish.

21. A computer numerical control-based method for chip breaking and the like in turning, boring, and other applications, comprising:
- engaging a workpiece with a cutting tool in a feed direction along a first toolpath segment; and
- engaging the workpiece with the cutting tool in the feed direction along a second toolpath segment;
- wherein an interaction of the first toolpath segment and the second toolpath segment results in one or more interrupted cuts and one or more chips being produced;
- wherein the first toolpath segment and the second toolpath segment are determined based on at least chip length, workpiece surface finish, and machine dynamic capability; and
- wherein a phase shift of the second toolpath segment is varied relative to a phase shift of the first toolpath segment.

22. The method of claim 21, wherein the method is utilized to one or more of control cutting tool wear, manage cutting temperature, create a structured surface, and improve a surface finish.

* * * * *